(12) United States Patent
Ozawa (10) Patent No.: US 8,787,253 B2
(45) Date of Patent: Jul. 22, 2014

(54) GATEWAY APPARATUS, COMMUNICATION METHOD AND PROGRAM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 850 days.

(21) Appl. No.: 12/937,680

(22) PCT Filed: Apr. 23, 2009

(86) PCT No.: PCT/JP2009/058067
§ 371 (c)(1),
(2), (4) Date: Oct. 13, 2010

(87) PCT Pub. No.: WO2009/131174
PCT Pub. Date: Oct. 29, 2009

(65) Prior Publication Data
US 2011/0032880 A1    Feb. 10, 2011

(30) Foreign Application Priority Data

Apr. 24, 2008    (JP) ................................ 2008-113434

(51) Int. Cl.
*H04W 4/00*    (2009.01)

(52) U.S. Cl.
USPC ............ 370/328; 370/310; 370/351; 370/349

(58) Field of Classification Search
None
See application file for complete search history.

(56) References Cited

U.S. PATENT DOCUMENTS

2006/0045363 A1* 3/2006 Dei et al. ...................... 382/232
2006/0109870 A1* 5/2006 Miyaji et al. .................. 370/537
2007/0053346 A1* 3/2007 Bettis et al. ................... 370/352
2010/0191608 A1* 7/2010 Mikkelsen et al. ............. 705/26
2011/0181682 A1* 7/2011 Belling et al. ............. 348/14.02

FOREIGN PATENT DOCUMENTS

| JP | 11-55324 A | 2/1999 |
| JP | 2006074555 A | 3/2006 |
| JP | 2006165935 A | 6/2006 |
| JP | 2008042767 A | 2/2008 |
| KR | 10-2002-0035666 A | 5/2002 |
| WO | 2007045522 A | 4/2007 |

OTHER PUBLICATIONS

International Search Report for PCT/JP2009/058067 mailed Jun. 9, 2009.
S. Marin, "Network Architecture for Inter-Technology Handoffs Using the MMCF", 3GPP2, TSG-A, A40-20050516-019 Mot, 2005, pp. 1-4.
Korean Office Action for KR10-2010-7023160 issued Aug. 17, 2011.

* cited by examiner

*Primary Examiner* — Anez Ebrahim
(74) *Attorney, Agent, or Firm* — Sughrue Mion, PLLC (57) ABSTRACT

A gateway apparatus that interconnects a mobile circuit switched network and a mobile IMS network to implement the video phone includes a conversion unit. The conversion unit demultiplexes a multiplexed bit stream signal output from a mobile terminal connected to the mobile circuit switched network to take out one or more of a control signal, a compression-encoded speech signal, and a compression-encoded video signal. The conversion unit converts the control signal into one or more of a MEGACO signal, a SIP signal and a SDP signal, while converting the speech signal and the video signal, if necessary. The conversion unit also packetizes the speech signal and the video signal to transmit resulting packets to the IMS network.

2 Claims, 6 Drawing Sheets

GATEWAY APPARATUS, COMMUNICATION METHOD AND PROGRAM

RELATED APPLICATION

The present application is the National Phase of PCT/JP2009/058067, filed Apr. 23, 2009, which claims priority rights based on the Japanese Patent Application 2008-113434, filed in Japan on Apr. 24, 2008. The total disclosure of this patent application of the senior filing date is to be incorporated herein by reference.

TECHNICAL FIELD

This invention relates to a gateway apparatus. More particularly, it relates to a gateway apparatus that allows for interconnection of a mobile terminal for circuit witching and a mobile terminal for IMS, a corresponding communication method, and a corresponding program.

BACKGROUND

Nowadays, in a mobile phone terminal and a mobile network, employing the third generation W-CDMA (Wideband Code Division Multiple Access) technology, video phone (TV telephone) services are implemented using a mobile circuit switched network and a protocol for circuit switching in accordance with the 3G-324M specifications of the 3GPP (Third Generation Partnership Project). As regards the 3G-324M specifications, reference may be made to 3GPP standards TS26.111, TS26.112 and TR26.911.

On the other hand, there is a move to implement video phone services or multimedia services using a mobile IMS (IP Multimedia Subsystem). A future trend may be towards integrating services on a mobile IMS network. As regards the mobile IMS, reference may be made to the 3GPP standard TS23.248.

Patent Document 1 discloses a gateway at a point of connection of a mobile terminal network for multimedia communication under 3GPP and the IP network. In multiplexing a speech and a moving picture from the IP network and transmitting the multiplexed data at a constant period of 64 kbps, the speech as well as the movement is adjusted to an optimum, rate to generate multiplexed data.

Patent Document 2 discloses a conversion apparatus in which, for implementing communication of speech and video between terminals connected to different networks, such as a circuit switched network and an IP network, control information is converted to enable the communication to be established even in case a codec of a terminal differs from that of the other terminal.

Patent Document 3 discloses a configuration including a video phone system which includes a gateway, an IP video phone terminal, connected to the gateway via an IP network, and an IP video phone terminal for a switched network, connected to the gateway over a switched network.

Patent Document 4 discloses a communication system in which an agent that exercises data communication control is provided in each of a server and a client, and in which another agent for controlling the data communication is provided in a gateway which is arranged on a network and to which are connected the server and the client. The information on the processing capability of the client terminal is acquired and data to be transmitted from the server terminal to the client is converted for transmission/reception.

[Patent Document 1] JP Patent Kokai Publication No. JP-P2006-74555A
[Patent Document 2] JP Patent Kokai Publication No. JP-P2006-165935A
[Patent Document 3] JP Patent Kokai Publication No. JP-P2008-42767A
[Patent Document 4] JP Patent Kokai Publication No. JP-A-11-55324

SUMMARY

The disclosures of the Patent Documents 1 to 4 are to be incorporated herein by reference.

The following is an analysis of the related techniques from the side of the present invention.

In integrating services on a mobile IMS network, it is necessary to interconnect multimedia services, such as video phone, employing a mobile circuit switched network or a protocol for circuit switching, currently in use, to the mobile IMS network.

However, such interconnection of multimedia services, employing a mobile circuit switched network or a protocol for circuit switching, to a mobile IMS network, has not so far been implemented.

On the other hand, the interconnection cannot be established in case capability information of a terminal connected to a mobile circuit switched network differs from that of another terminal connected to a mobile IMS network or connected via a mobile IMS network to a mobile circuit switched network of the counterpart terminal.

It should be noted that none of the Publications 1 to 4 provide a means for solution of the above problems.

It is therefore an object of the present invention to provide a gateway apparatus, program and method in which multimedia services, such as video phone, employing a mobile circuit switched network or a protocol for mobile circuit switching, and a mobile IMS network, are interconnected, and in which a mobile terminal for circuit switching and a mobile terminal for IMS may be interconnected to implement integrated services as IMS.

According to the present invention, there is provided a gateway apparatus that interconnects a mobile circuit switched network and a mobile IMS (IP Multimedia Subsystem) network to implement video phone. The gateway apparatus comprises a conversion unit that demultiplexes a multiplexed bit stream signal output from a terminal connected to the mobile circuit switched network, to take out at least one of a control signal, a compression-encoded speech signal, and a compression-encoded video signal, converts the control signal into at least one of a MEGACO (Media Gateway Control) signal, a SIP (Session Initiation Protocol) signal and a SDP (Session Description Protocol) signal, converts the speech signal, if necessary, while also converting the video signal, if necessary, and packetizes the speech signal and the video signal to send a resulting packet to the IMS network.

According to the present invention, there is also provided a gateway apparatus that interconnects a mobile circuit switched network and a mobile IMS network to implement video phone. The gateway apparatus comprises a conversion unit that receives a SIP (Session Initiation Protocol) signal and/or a SDP (Session Description Protocol) signal output from a terminal connected to the mobile IMS network, receives at least one of a packetized compression-encoded speech signal, and a packetized compression-encoded video signal, converts the SIP signal or the SDP signal into a control signal composed of at least one of a MEGACO (Media Gateway Control) signal and a H.245 signal, converts the speech signal, if necessary, while also converting the video signal, if necessary, and multiplexes the speech signal and the video signal to transmit a resulting signal to the mobile circuit switched network.

According to the present invention, there is also provided a gateway apparatus that interconnects a mobile circuit switched network and a mobile IMS network to implement video phone. The gateway apparatus includes a conversion unit that converts one or more of a control signal, a bit rate, a sampling frequency, an image resolution, a frame rate and a compression scheme as capability information.

According to the present invention, there is also provided a communication control method employing a gateway apparatus that interconnects a mobile circuit switched network and a mobile IMS (IP Multimedia Subsystem) network to implement video phone. The method comprises:

demultiplexing a multiplexed bit stream signal, output from a terminal connected to the mobile circuit switched network, to take out at least one of a control signal, a compression-encoded speech signal and a compression-encoded video signal, converting the control signal into at least one of a MEGACO (Media Gateway Control) signal, a SIP (Session Initiation Protocol) signal and a SDP (Session Description Protocol) signal, converting the speech signal, if necessary, converting the video signal, if necessary, and packetizing the speech signal and the video signal to transmit resulting packets to the IMS network.

According to the present invention, there is also provided a communication control method employing a gateway apparatus that interconnects a mobile circuit switched network and a mobile IMS network to implement video phone. The method comprises:

receiving a SIP (Session Initiation Protocol) signal and/or a SDP (Session Description Protocol) signal output from a terminal connected to the mobile IMS network, receiving at least one of a packetized compression-encoded speech signal, and a packetized compression-encoded video signal, converting the SIP signal or the SDP signal into a control signal composed of at least one of a MEGACO (Media Gateway Control) signal and a H.245 signal, converting the speech signal, if necessary, converting the video signal, if necessary, and multiplexing the speech signal and the video signal to send a resulting signal to the mobile circuit switched network.

According to the present invention, there is also provided a program for causing a computer constituting a gateway apparatus that interconnects a mobile circuit switched network and a mobile IMS (IP Multimedia Subsystem) network to implement video phone to execute the processing comprising:

demultiplexing a multiplexed bit stream signal transmitted from a terminal connected to the mobile circuit switched network, to take out at least one of a control signal, a compression-encoded speech signal and a compression-encoded video signal;

converting the control signal into at least one of a MEGACO (Media Gateway Control) signal, a SIP (Session Initiation Protocol) signal and a SDP (Session Description Protocol) signal;

converting the speech signal, if necessary;

converting the video signal, if necessary; and packetizing the speech signal and the video signal to transmit resulting packets to the IMS network. According to the present invention, there is also provided a computer-readable recording medium or computer program product which stores the above program.

According to the present invention, there is also provided a program for causing a computer constituting a gateway apparatus that interconnects a mobile circuit switched network and a mobile IMS network to implement video phone to execute the processing comprising:

receiving a SIP (Session Initiation Protocol) signal and/or a SDP (Session Description Protocol) signal transmitted from a terminal connected to the mobile IMS network;

receiving a packetized compression-encoded speech signal, and/or a packetized compression-encoded video signal;

converting the SIP signal or the SDP signal into a control signal composed of at least one of a MEGACO (Media Gateway Control) signal and a H.245 signal;

converting the speech signal, if necessary;

converting the video signal, if necessary; and multiplexing the control signal with the speech signal and the video signal to transmit a resulting signal to the IMS network. According to the present invention, there is also provided a computer-readable recording medium or computer program product which stores the above program.

According to the present invention, multimedia services, such as video phone, employing a mobile circuit switched network or a protocol for mobile circuit switching, are interconnected to a mobile IMS network to enable interconnection of a mobile terminal for circuit switching and a mobile terminal for IMS, thereby implementing integrated services as IMS.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 2:
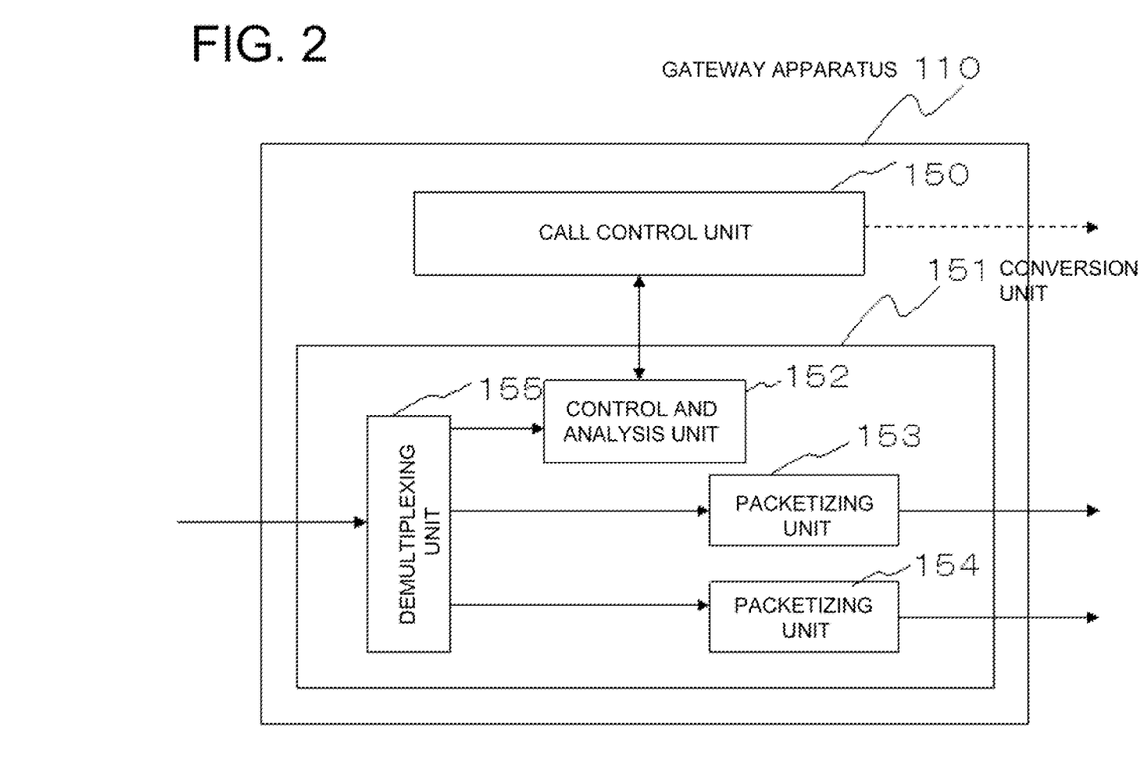
FIG. 2 is a schematic block diagram showing a configuration of a gateway apparatus of a first exemplary embodiment of the present invention.

Exemplary embodiments of the present invention will now be described in detail with reference to the drawings. Referring to FIG. 2, a gateway apparatus according to an exemplary embodiment of the present invention includes a call control unit (150) and a conversion unit (151). The conversion unit (151) includes a demultiplexing unit (155), a control and analysis unit (152) and packetizing units (153) and (154). The demultiplexing unit (155) receives a bit stream, which is transmitted in a multiplexed manner by a terminal connected to a mobile circuit switched network via the mobile circuit switched network and that de-multiplexes the bit stream to take out a control signal, a compression-encoded speech signal, and a compression-encoded video signal. The control and analysis unit (152) receives the control signal and converts the control signal received into a control signal according to MEGACO to output the resulting control signal to the call control unit. The packetizing unit (153) stores a compression-encoded speech signal bit stream, in a packet, and outputs a resulting packet. The packetizing unit (154) stores a compression-encoded video signal bit stream in a packet, and outputs a resulting packet. The call control unit (150) receives the MEGACO signal from the control and analysis unit (152) to convert the received MEGACO signal into a SIP signal or a SDP signal.

Figure 4:
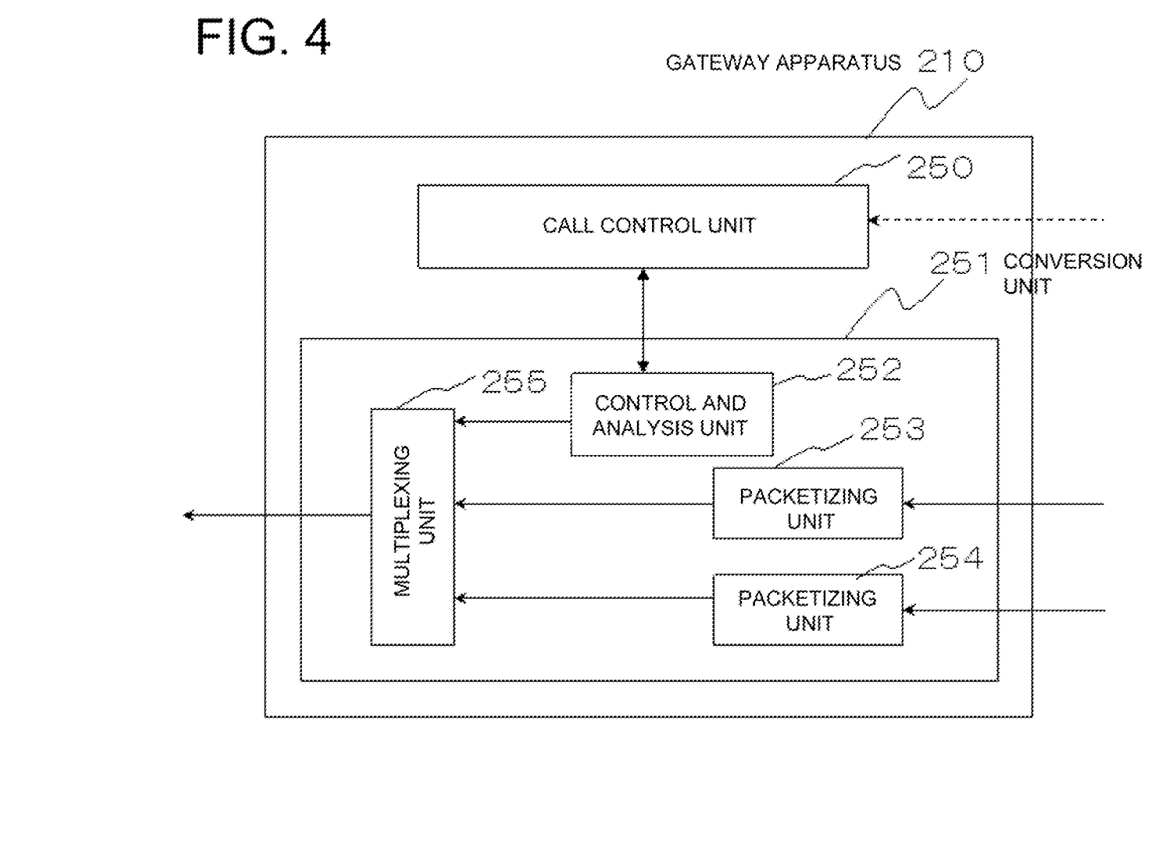
FIG. 4 is a schematic block diagram showing a configuration of a gateway apparatus of a second exemplary embodiment of the present invention.

In the gateway apparatus according to another exemplary embodiment of the present invention, as shown in FIG. 4, the conversion unit (251) includes a multiplexing unit (255), a packetizing unit (depacketizing unit) (253) that receives a speech packet to output a compression-encoded speech signal bit stream to the multiplexing unit, a packetizing unit (depacketizing unit) (254) that receives a video packet to output a compression-encoded video signal bit stream to the multiplexing unit (255), a control and analysis unit (252) that receives a control signal from a call control unit (250) and that converts the control signal received to preset control information to output the information to the multiplexing unit (255). The multiplexing unit (255) receives the control signal from the control and analysis unit (252) and compression-encoded bit streams, from the packetizing units (253, 254) and generates a multiplexed bit stream to output the bit stream generated to the mobile circuit switched network.

Figure 6:
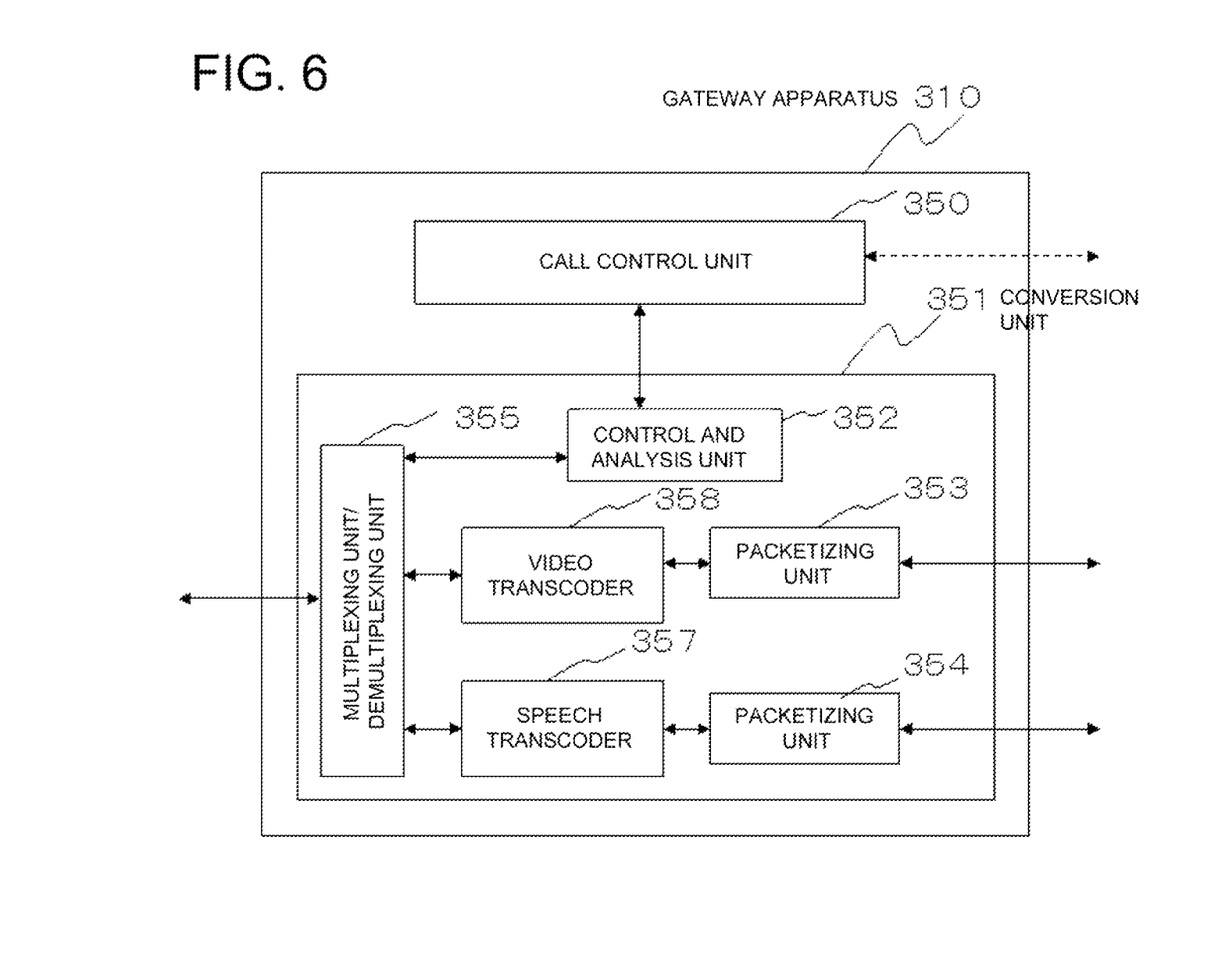
FIG. 6 is a schematic block diagram showing a configuration of a gateway apparatus of a third exemplary embodiment of the present invention.

In the gateway apparatus according to another exemplary embodiment of the present invention, the conversion unit (351) includes, as shown in FIG. 6, a multiplexing/demultiplexing unit (355), a control and analysis unit (352), a speech transcoder (357), a video transcoder (358) and packetizing units (353), (354). The multiplexing/demultiplexing unit (355) receives a bit stream signal, which is transmitted in a multiplexed manner by a terminal connected to the mobile circuit switched network via the mobile circuit switched network and demultiplexes the bit stream. The multiplexing/demultiplexing unit (355) takes out a control signal to send the signal to the control and analysis unit (352) and also takes out the compression-encoded speech signal, and the compression-encoded video signal, to output the compression-encoded speech and video signals to the speech transcoder (357) and to the video transcoder (358), respectively. The multiplexing/demultiplexing unit receives a control signal from the control and analysis unit (352), a bit stream of the compression-encoded speech signal from the speech transcoder (357) and a bit stream of the compression-encoded video signal from the video transcoder (358) and generates a multiplexed bit stream to send the bit stream to the mobile circuit switched network. The control and analysis unit (352) receives the control signal, obtained on demultiplexing by the multiplexing/demultiplexing unit, and converts the control signal received into a control signal according to MEGACO to output the resulting control signal to the call control unit (350). The control and analysis unit (352) receives the control signal according to MEGACO from the call control unit (350) and converts the control signal received into the H.245 control information to output the resulting control information to the multiplexing/demultiplexing unit (355). The packetizing unit (354) stores a compression-encoded speech signal from the speech transcoder (357), in a packet, and outputs the resulting packet. The packetizing unit (354) also receives a speech packet output from a terminal connected to the mobile IMS network to output a compression-encoded speech signal bit stream, to the speech transcoder (357). The packetizing, unit (353) stores a compression-encoded video signal bit stream from the video transcoder (358), in a packet, and outputs the resulting packet. The packetizing unit (353) also receives a video packet output from a terminal connected to the mobile IMS network to output a compression-encoded video signal bit stream to the video transcoder (358). The call control unit (350) receives a MEGACO signal from the control and analysis unit (352) and converts the MEGACO signal received into a SIP signal or a SDP signal to output the resulting SIP or SDP signal to the mobile IMS network. The call control unit (350) also receives a SIP signal or a SDP signal from the mobile IMS network to convert the signal received into a MEGACO signal to supply the resulting MEGACO signal to the control and analysis unit (352).

According to the present invention, a communication control method that uses a gateway apparatus to interconnect a mobile circuit switched network and a mobile IMS (IP Multimedia Subsystem) network to implement a video phone includes the following steps:

Step 1: The gateway apparatus demultiplexes a multiplexed bit stream, output from a terminal connected to a mobile circuit switched network, to take out at least one of a control signal, a compression-encoded speech signal, and a compression-encoded video signal.

Step 2: The gateway apparatus converts the control signal into at least one of a MEGACO (Media Gateway Control) signal, a SIP (Session Initiation Protocol) signal and a SDP (Session Description Protocol) signal.

Step 3: The gateway apparatus converts the speech signal, if necessary, while converting the video signal, again if necessary.

Step S4: The gateway apparatus packetizes the speech signal and the video signal to transmit the resulting packetized signals to the IMS network.

The communication control method according to another exemplary embodiment includes the following steps:

Step 1: The gateway apparatus receives a SIP (Session Initiation Protocol) and/or a SDP (Session Description Protocol) output from a terminal connected to the mobile IMS network.

Step 2: The gateway apparatus receives at least one of a packetized compression-encoded speech signal, and a packetized compression-encoded video signal.

Step 3: The gateway apparatus converts the SIP signal or the SDP signal into a control signal composed of at least one of the MEGACO (Media Gateway Control) signal and the H.245 signal.

Step 4: The gateway apparatus converts the speech signal, if necessary, while converting the video signal, again if necessary.

Step 5: The gateway apparatus multiplexes the control signal with the speech and video signals and transmits the resulting signal to the mobile circuit switched network.

The present invention is now described with reference to exemplary embodiments.

Exemplary Embodiment 1

Figure 1:
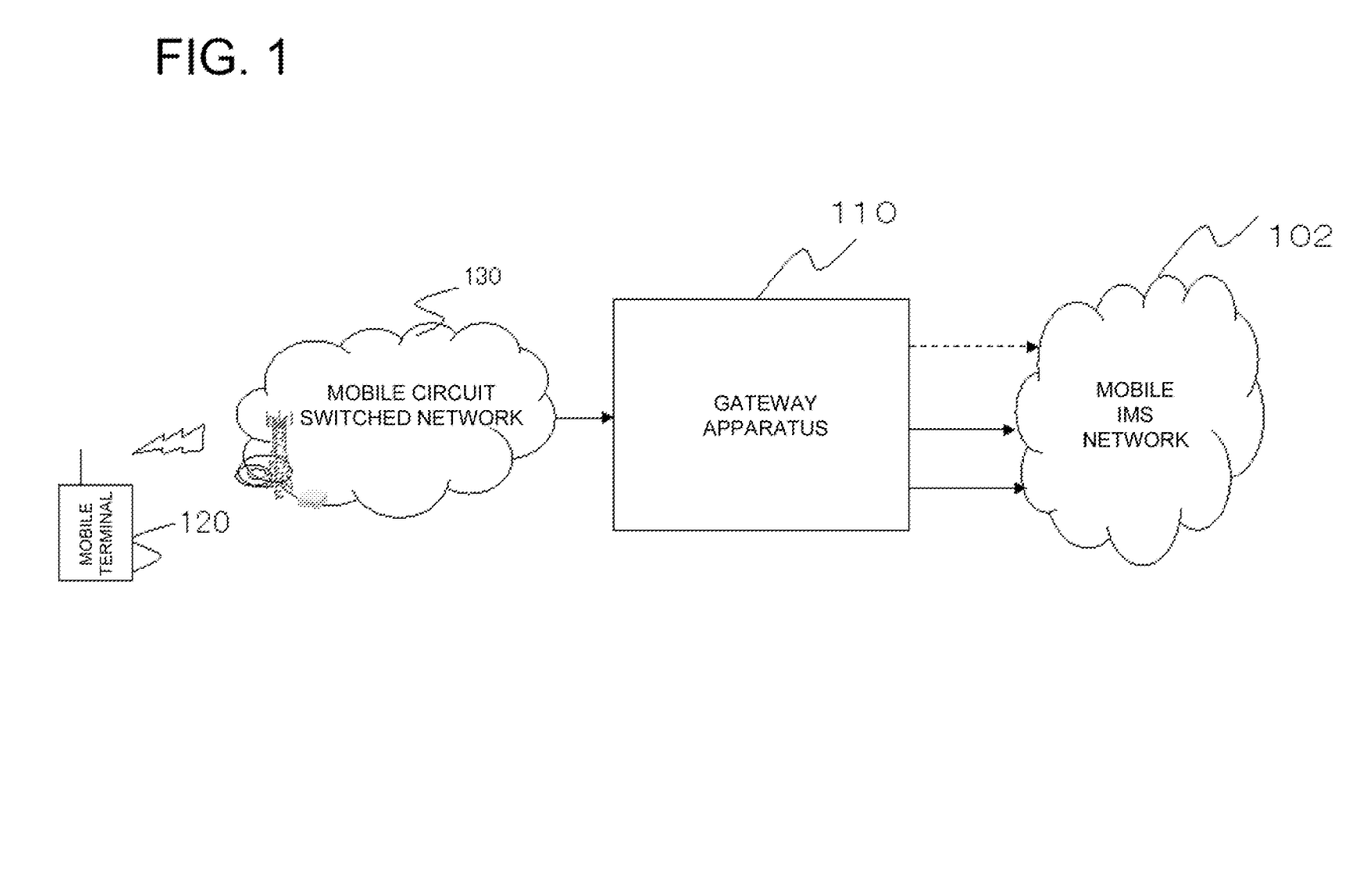
FIG. 1 is a schematic block diagram showing a configuration of a system of a first exemplary embodiment of the present invention.

FIG. 1 shows an entire system of a gateway apparatus according to the present invention. In FIG. 1, a mobile terminal 120 is a pre-existing terminal connected to a circuit switched mobile network, and conforms to the specifications by the 3GPP 3G324M standard. For the 3GPP 3G324M standard, reference may be made to specifications of GPP TS26.111, TS26.112 and TR26.911.

The mobile terminal 120 is connected to a mobile circuit switched network 130 and transmits/receives a bit stream of 64 kbps multiplexed from a control signal, a video signal and a speech signal.

A gateway apparatus 110 receives a bit stream signal which has been multiplexed in accordance with the 3G324M standard and output by the mobile terminal 120. The gateway apparatus 110 demultiplexes the bit stream to take out at least a control signal, a compression-encoded speech signal, and a compression-encoded video signal.

The gateway apparatus 110 converts the control signal into at least one of a MEGACO signal, a SIP signal and a SDP signal, and transmits the resulting signal to a mobile IMS network 102.

The gateway apparatus 110 converts the compression-encoded speech signal, and the compression-encoded video signal, if necessary, and packetizes the speech and video signals. The so packetized signals are transmitted to the mobile IMS network 102.

FIG. 2 shows an example of a configuration of the gateway apparatus 110 of FIG. 1. Referring to FIG. 2, the gateway apparatus 110 includes a call control unit 150 and a conversion unit 151. In the following, the conversion unit 151 and the call control unit 150 are described in this order.

The conversion unit 151 includes a demultipexer 155, a control and analysis unit 152 and packetizing units 153 and 154.

The demultiplexing unit 155 receives a hit stream transmitted from the mobile terminal 120 via a mobile circuit switched network 130. This bit stream has been multiplexed in accordance with the 3GPP 3G324M standard. The demultiplexing unit 155 demultiplexes the compression-encoded picture signal to take out a H.245 control signal, a compression-encoded speech signal, and a compression-encoded video signal, to output the H.245 control signal, thus taken out, to the control and analysis unit 152.

The H.245 control signal includes speech codec information, video codec information, a bit rate of each codec, decoding information necessary for decoding video codec (Decoder Configuration Information, abbreviated to DCI) and opening or closing information of video and speech channels, by way of examples.

The control and analysis unit 152 receives the 1-1.245 control signal and transforms the control information to, for example, control signals according to MEGACO, such as 'Request', 'Modify' or 'Notify', to output the resulting control signals to the call control unit 150. For details of MEGACO, reference may be made to the ITU-T H.248 standard.

It is assumed that, in the present and the following embodiments, a compression-encoded speech signal, is a bit stream obtained on compression-encoding by the AMR speech codec at the mobile terminal 120, as an example. For details of the AMR codec, reference may be made to 3GPP S26.090 standard.

It is also assumed that, in the present and the following Examples, a compression-encoded video signal, is a bit stream obtained on compression-encoding by MPEG-4 video codec at the mobile terminal 120, as an example. For details of the MPEG-4, reference may be made to 3GPP TS26.111 standard or to ISO/IEC 14496-2 standard.

The packetizing unit 153 stores the compression-encoded speech signal hit stream, in an RTP (Realtime Transport Protocol) packet in accordance with the AMR (Adaptive Multi Rate) payload format specifications by IETF (Internet Engineering Task Force) RFC3267, and outputs the resulting packet. It is noted that the frame type information of AMR represents the bit rate, and hence is transformed into the codec mode request (CMR) information of RFC3267.

Octet align and other parameters of RFC3267 as needed are set in the MPEG-4 payload format specifications by IETF RFC3016.

The packetizing unit 154 stores the compression-encoded video signal bit stream, in an RTP packet, in accordance with the MPEG-4 payload format specifications by IETF RFC3016, and outputs the resulting packet.

The call control unit 150 receives the MEGACO signal from the control and analysis unit 152 and transforms the so received MEGACO signal into a SIP signal or a SDP signal, which is output. For details of SIP and SDP, reference may be made to IETF RFC3261 or RFC2327.

In the present Example, not only the speech codec and the video codec, referred to above, but other well-known codecs may also be used. The control and analysis unit 152 need not be arranged within the conversion unit 151, and may also be arranged within the call control unit 150.

The call control unit 150 and the conversion unit 151 may also be arranged separately within respective different devices.

With the present exemplary embodiment, there may be provided a gateway apparatus in which multi-media services, such as video phone (TV telephone), employing a mobile circuit switched network or a mobile circuit switched protocol, and the mobile IMS network, are interconnected, and in which a mobile terminal for circuit switching and a mobile terminal for mobile IMS may be interconnected to implement integrated services as IMS.

In the present embodiment, the processing by the demultipexer 155, control and analysis unit 152, packetizing units 153 and 154, and the call control unit 150 may be implemented by a program executed on a computer.

Exemplary Embodiment 2

Figure 3:
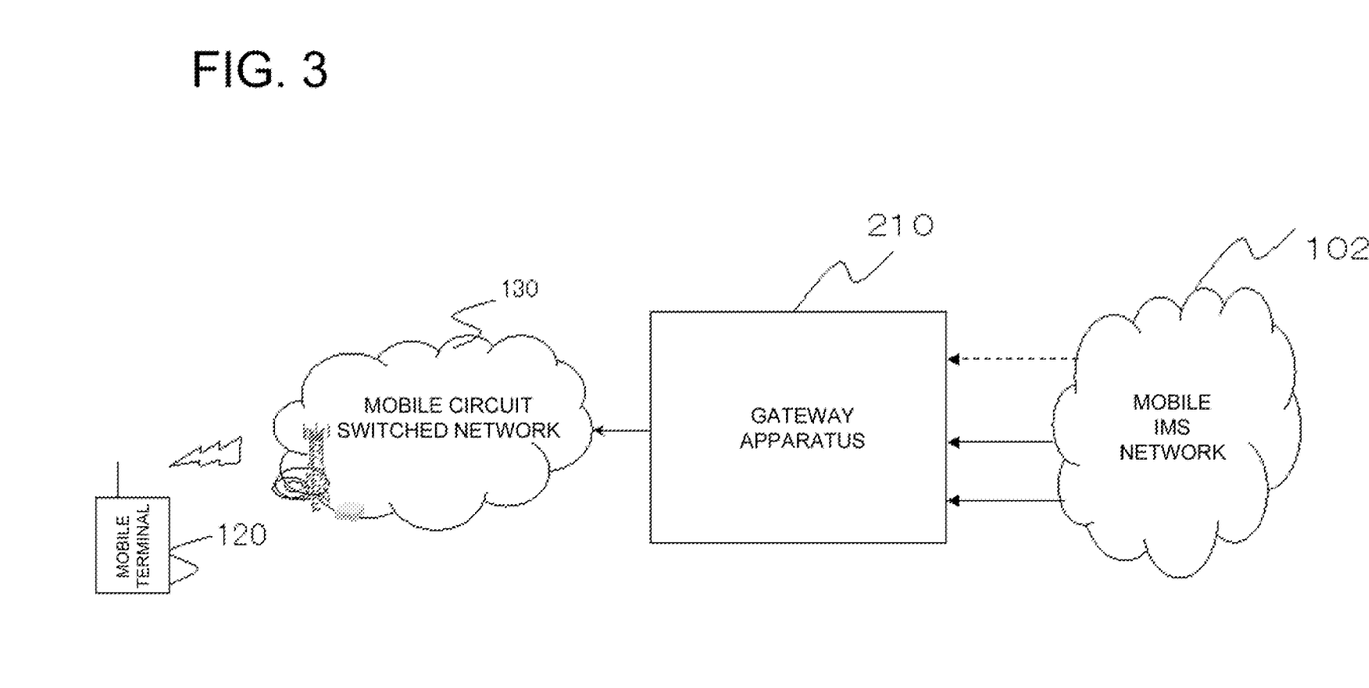
FIG. 3 is a schematic block diagram showing a configuration of a system of a second exemplary embodiment of the present invention.

FIG. 3 shows a configuration of a second exemplary embodiment of the present invention. In FIG. 3, parts or components which are the same as those of FIG. 1 are indicated by the same reference numerals or symbols. In the following, the parts or components which are the same as those of FIG. 1 perform the same operation as that of FIG. 1, and hence the corresponding description is dispensed with.

Referring to FIG. 3, a gateway apparatus 210 receives a call control signal, as a video phone connection request, a speech RTP packet and a video RTP packet, from a mobile IMS network 102. The gateway apparatus then multiplexes the control signal, the compression-encoded speech signal, and the compression-encoded video RTP packet to generate a multiplexed bit stream of 64 kbps, and sends the resulting stream via mobile circuit switched network 130 to a mobile terminal 120.

FIG. 4 shows an example configuration of the gateway apparatus 210 of FIG. 3. Referring to FIG. 4, the gateway apparatus 210 includes a call control unit 250 and a conversion unit 251.

The conversion unit 251 will now be described. The conversion unit includes a multiplexing unit 255, a control and analysis unit 252 and packetizing units 253 and 254. The packetizing units 253 and 254 are also termed depacketizing units.

The packetizing unit 253 receives a speech packet, formed as an RTP packet in accordance with the AMR payload format specifications by IETF RFC3267, and reads the codec mode request (CMR) information, octet align or other needed parameters from the payload format header. The packetizing unit 253 also reads an AMR bit stream from a payload in accordance with the above parameters and specifies the bit rate from the CMR information. The packetizing unit 254 transforms the so specified bit rate into the frame type information of the AMR bit stream to output the latter to the multiplexing unit 255.

The packetizing unit 254 receives an RTP packet, formed in accordance with the specifications of MPEG-4 payload format by IETF RFC3016, in the video signal bit stream compressed on encoding. The packetizing unit 254 reads the needed information from the payload format and outputs the so read out bit stream to the multiplexing unit 255.

The control and analysis unit 252 receives a MEGAPO signal, for example, from the call control unit 250, and transforms the signal to a H.245 control information, which is output to the multiplexing unit 255. The H.245 control information includes the speech codec information, video codec information, the bit rate of each codec, the decoding information necessary for decoding the video codec (Decoder Configuration Information, abbreviated to DCI) and the information for opening or closing the video and speech channels, by way of examples.

The multiplexing unit 255 receives the H.245 control signal from the control and analysis unit 252, while also receiving an AMR bit stream, compressed on encoding, from the packetizing unit 253. The multiplexing unit 255 also receives a bit stream, compressed by encoding by MPEG-4, from the packetizing unit 254. The multiplexing unit generates, from the control signal and the bit streams received, a multiplexed bit stream, prescribed under the 3G324M H.223 specifications, to send the so generated multiplexed bit stream.

The call control unit 250 receives SIP and SDP signals from the mobile IMS network, and transforms the received signals into a MEGACO signal, which is then transmitted to the control and analysis unit 252.

In FIG. 4, a jitter buffer section upstream of the packetizing units 253 and 254 is not shown. This jitter buffer section may, however, be provided upstream of the packetizing units to take up the jitter caused in the network in the RTP packet. As in embodiment 1, any suitable known codecs other than those described above may be used. The control and analysis unit 252 need not be arranged within the conversion unit 251, and may also be arranged within the call control unit 250.

The call control unit 250 and the conversion unit 251 may also be arranged separately within respective different devices.

With the present embodiment, in which a control signal for mobile circuit switching is transformed into the session description information of the mobile IMS network, it is possible to interconnect the mobile terminal for circuit switching and the mobile terminal for mobile IMS.

With the present embodiment, the processing by the multiplexing unit 255, control and analysis unit 252 and the packetizing units 253 and 254 in the conversion unit 251 may be implemented by a program executed on a computer.

Exemplary Embodiment 3

Figure 5:
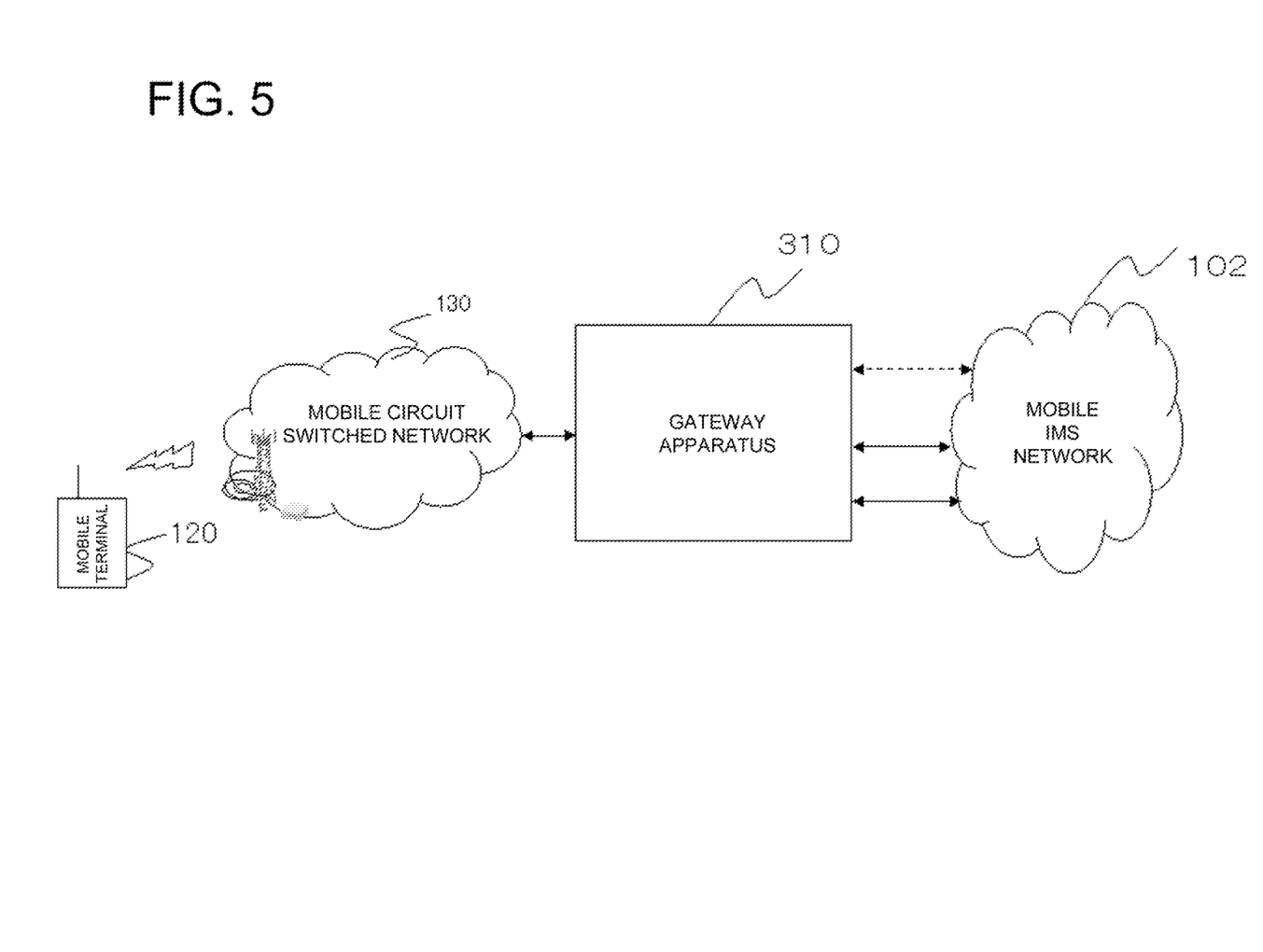
FIG. 5 is a schematic block diagram showing a configuration of a system of a third exemplary embodiment of the present invention.

FIG. 5 shows a configuration of a third exemplary embodiment of the present invention. In FIG. 5, there is shown an arrangement for bidirectional interconnection between the mobile terminal 120 and the mobile IMS network 102. In FIG. 5, parts or components which are the same as those of FIG. 1 are indicated by the same reference numerals or symbols. In FIG. 5, the parts or components which are the same as those of FIG. 1 perform the same operation as that of FIG. 1, and hence the corresponding description is dispensed with.

Referring to FIG. 5, a gateway apparatus 310 includes, in its conversion unit, at least one of a speech encoder and a video encoder for transforming at least one of a bit rate, a sampling frequency, an image resolution and a compression scheme in connection with the speech and the video.

In FIG. 6, there is shown an example configuration of a gateway apparatus 310 of FIG. 5. In FIG. 6, a multiplexing/demultiplexing unit 355 performs an integrated operation of demultiplexing by the demultipexer 155 and multiplexing by the multiplexing unit 255 of FIG. 4. In the following, description is made in connection with a direction of connection from the mobile terminal 120 through the mobile circuit switched network 130 and the gateway apparatus 310 to the mobile IMS network 102, and the description in connection with the reverse direction is dispensed with. It is however of course possible to make the connection in the reverse direction.

In a conversion unit 351, the multiplexing/demultiplexing unit 355 demultiplexes the multiplexed bit stream received to take out the H.245 control signal, compression-encoded speech signal and the compression-encoded video signal. The multiplexing/demultiplexing unit outputs the H.245 control signal to a control and analysis unit 352.

It is noted that the H.245 control information includes the speech codec information, video codec information, the bit rate of each codec, the decoding information necessary for decoding the video codec (Decoder Configuration Information, abbreviated to DCI) and the information for opening or closing the video and speech channels, by way of examples.

The control and analysis unit 352 receives the H.245 control signal from the multiplexing/demultiplexing unit 355.

The control and analysis unit 352 also receives the control signal, received by the call control unit 350 from the side mobile IMS network by SIP or SDP, as a MEGACO signal, for instance.

The control and analysis unit 352 collates the capability information of the mobile terminal 120, contained in the H.245 control signal, with the capability information of the mobile IMS network contained in the control signal according to MEGACO.

It is then checked whether or not a codec, a bit rate and a sampling frequency of the speech stream are all in agreement. If one or more of the parameters are not in agreement, the control and analysis unit 352 sends an instruction to the speech transcoder 357 to activate the speech transcoder for transcoding.

It is then checked whether or not an image resolution, a bit rate, codec and a frame rate of the video stream are all in agreement. If one or more of the parameters are not in agreement, the control and analysis unit 352 sends an instruction to the video transcoder 358 to activate the video transcoder for transcoding.

The speech transcoder 357 receives from the control and analysis unit 352 an instruction for activating the transcoder and an instruction which of the parameters is to be converted. This activates the speech transcoder 357 to carry out the transcoding.

For example, if the speech codec of the mobile terminal 120 is AMR and the speech codec of the mobile IMS network side is G.711, transcoding between AMR and G.711 is carried out, and the bit stream, compressed for encoding by G.711, is output to the packetizing unit 354.

The video transcoder 358 receives from the control and analysis unit 352 an instruction for activating the transcoder and an instruction which of the parameters is to be converted. This causes the video transcoder 358 to be activated to execute the transcoding (conversion).

It is now assumed that the video codec of the mobile terminal 120 and that of the mobile IMS side are both MPEG-4. It is also assumed that the bit rate of the mobile terminal 120 is 64 kbps, but that of the IMS network is different therefrom and is 128 kbps. In such case, when performing video transcoding and sending out the transcoded picture to the mobile IMS network, the video transcoder 358 increases the bit rate and outputs the transcoded picture at the increased rate to the packetizing unit 353.

It should be noted that, in case the mobile IMS network side is able to receive the transcoded bit stream at a bit rate lower than 128.5 kbps, such as 64 kbps, the speech transcoder 357 may directly output the bit stream without transcoding.

The packetizing units 353 and 354 perform the combined functions of the packetizing units 153 and 154 of FIG. 2 and the packetizing units 253 and 254 of FIG. 4 to perform bidirectional operations.

The call control unit 350 performs the combined functions of the call control unit 150 of FIG. 2 and the call control unit 250 of FIG. 4 to perform bidirectional connection.

In the third exemplary embodiment, any suitable known speech/video codecs other than those described above may be used.

The control and analysis unit 352 need not be arranged within the conversion unit 351, and may also be arranged within the call control unit 350.

The call control unit 350 and the conversion unit 351 may also be arranged separately within respective different devices.

The gateway apparatus according to the present invention includes a conversion unit which, in case one or more of a bit rate, sampling frequency, image resolution, frame rate and compression scheme, as parameters of the capability information of one of the terminals; differs from those of another terminal, detects and transcodes such differing parameter(s). It is thus possible to interconnect terminals differing in the capability information.

With the present embodiment, the processing by the multiplexing unit 355, control and analysis unit 352, depacketizing units 253 and 354 and by the call control unit 350 in the conversion unit 351 may be implemented by a program executed on a computer.

The disclosures of the aforementioned above Patent Documents are incorporated by reference herein. The exemplary embodiments may be modified or adjusted within the gamut of the entire disclosure of the present invention, inclusive of claims, based on the fundamental technical concept of the invention. Further, variegated combinations or selections of the elements disclosed herein may be made within the framework of the claims. That is, the present invention may encompass various modifications or corrections that may occur to those skilled in the art within the gamut of the entire disclosure of the present invention, inclusive of claim and the technical concept of the present invention.

What is claimed is:

1. A gateway apparatus that interconnects a mobile circuit switched network and a mobile IMS (IP Multimedia Subsystem) network to implement video phone, the apparatus comprising: a conversion unit that demultiplexes a multiplexed bit stream signal transmitted from a terminal which is connected to the mobile circuit switched network to take out at least one of a control signal, a compression-encoded speech signal and a compression-encoded video signal, converts the control signal into at least one of a MEGACO (Media Gateway Control) signal, a SIP (Session Initiation Protocol) signal and a SDP (Session Description Protocol) converts the speech signal, if the conversion unit decides that a conversion of the speech signal is necessary, and converts the video signal, if the conversion unit decides that a conversion of the video signal is necessary, and packetizes the compression-encoded speech signal or the converted speech signal, and packetizes the compression-encoded video signal or the converted video signal respectively to transmit resulting packets to the IMS network; a call control unit, wherein the conversion unit includes: a multiplexing/demultiplexing unit; a control and analysis unit; a speech transcoder; a video transcoder; a first packetizing unit; and a second packetizing unit, wherein the multiplexing/demultiplexing unit receives a bit stream signal transmitted in a multiplexed manner, via the mobile circuit switched network, by a terminal which is connected to the mobile circuit switched network, demultiplexes the bit stream, takes out a control signal to send the control signal to the control and analysis unit, takes out the compression-encoded speech signal and compression-encoded video signal, to output the compression-encoded speech signal and compression-encoded video signal to the speech transcoder and to the video transcoder, respectively, receives a control signal from the control and analysis unit, a bit stream of the compression-encoded speech signal from the speech transcoder, and a bit stream of the compression-encoded video signal from the video transcoder, and generates a multiplexed bit stream to transmit the bit stream to the mobile circuit switched network, the control and analysis unit receives the control signal, obtained by demultiplexing by the multiplexing/demultiplexing unit, and converts the control signal received into a control signal according to MEGACO to output the resulting control signal to the call control unit, and receives the control signal according to MEGACO from the call control unit and converts the control signal received into the H.245 control information to output the resulting control information to the multiplexing/demultiplexing unit, the first packetizing unit stores the compression-encoded speech signal from the speech transcoder in a packet and outputting the resulting packet, and receives a speech packet transmitted from a terminal connected to the mobile IMS network to output a compression-encoded speech signal bit stream to the speech transcoder, the second packetizing unit stores a compression-encoded video signal bit stream from the video transcoder in a packet to output the resulting packet, and receives a video packet transmitted from a terminal connected to the mobile IMS network to output a compression-encoded video signal bit stream to the video transcoder, and the call control unit receives the MEGACO signal from the control and analysis unit and converts the MEGACO signal received into a SIP signal or a SDP signal to transmit the SIP or SDP signal to the mobile IMS network, and receives the SIP or SDP signal from the mobile IMS network and converts the SIP or SDP signal received into a MEGACO signal to supply the converted signal to the control and analysis unit.

2. The gateway apparatus according to claim 1, wherein the control and analysis unit compares capability information of a terminal which is connected to the mobile circuit switched network, capability information included in a control signal demultiplexed by the multiplexing/demultiplexing unit, with capability information of the mobile IMS network included in the control signal according to MEGACO, the control and analysis unit sends an instruction to the speech transcoder to perform transcoding in a speech stream in case at least one of a codec, a bit rate and a sampling frequency, as parameters, is not coincident, and sends an instruction to the video transcoder to perform transcoding in a video stream in case at least one of an image resolution, a bit rate, a codec and a frame rate, as parameters, is not in agreement, the speech transcoder receives, from the control and analysis unit, an instruction for activating the transcoder and an instruction on which of the parameters is to be converted, to carry out processing for transcoding, and the video transcoder receives, from the control and analysis unit, an instruction to starting the transcoder and an instruction on which of the parameters is to be converted, to carry out processing for transcoding.

* * * * *